(12) United States Patent
Cooper

(10) Patent No.: US 9,476,492 B2
(45) Date of Patent: Oct. 25, 2016

(54) ACTIVE LIMITED SLIP DIFFERENTIAL

(71) Applicant: Dana Automotive Systems Group, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 48 days.

(21) Appl. No.: 14/558,951

(22) Filed: Dec. 3, 2014

(65) Prior Publication Data

US 2015/0211619 A1 Jul. 30, 2015

Related U.S. Application Data

(60) Provisional application No. 61/931,001, filed on Jan. 24, 2014.

(51) Int. Cl.
| | |
|---|---|
| *F16H 48/22* | (2006.01) |
| *F16H 48/30* | (2012.01) |
| *F16H 48/08* | (2006.01) |
| *F16H 48/40* | (2012.01) |
| *F16H 48/34* | (2012.01) |

(52) U.S. Cl.
CPC ............... *F16H 48/22* (2013.01); *F16H 48/08* (2013.01); *F16H 48/30* (2013.01); *F16H 48/40* (2013.01); *F16H 48/34* (2013.01)

(58) Field of Classification Search
CPC ..................... F16H 2048/423; F16D 2125/36
See application file for complete search history.

(56) References Cited

U.S. PATENT DOCUMENTS

| | | | |
|---|---|---|---|
| 4,895,236 A | 1/1990 | Sakakibara et al. | |
| 5,080,640 A | 1/1992 | Botterill | |
| 5,106,349 A | 4/1992 | Botterill et al. | |
| 5,699,888 A * | 12/1997 | Showalter | B60K 17/3505 192/35 |
| 6,378,677 B1 * | 4/2002 | Kuroda | B60K 23/04 192/35 |
| 6,460,677 B1 | 10/2002 | Roscoe | |
| 6,478,708 B2 | 11/2002 | Krisher | |
| 6,533,090 B2 * | 3/2003 | Osborn | F16H 48/34 192/48.2 |
| 6,561,939 B1 | 5/2003 | Knapke | |
| 6,571,928 B1 | 6/2003 | Gassmann | |
| 7,001,303 B1 | 2/2006 | Peura | |
| 7,004,873 B2 | 2/2006 | Puiu | |
| 7,175,557 B2 | 2/2007 | Kirkwood et al. | |
| 7,201,264 B2 | 4/2007 | Puiu | |
| 7,337,886 B2 | 3/2008 | Puiu | |
| 7,338,403 B2 | 3/2008 | Puiu | |

(Continued)

OTHER PUBLICATIONS

Extended European Search Report and European Search Opinion for application No. EP15151869.3 dated Jun. 3, 2015.

*Primary Examiner* — Tisha Lewis
(74) *Attorney, Agent, or Firm* — Marshall & Melhorn, LLC

(57) ABSTRACT

A limited slip differential assembly for a vehicle has a differential assembly drivingly engaged with a prime mover of the vehicle. The assembly has a differential mechanism disposed in a differential case and two opposite output shafts outwardly extending from the differential case. A torque coupling unit is provided for selectively restricting rotation between one of the output shafts and the differential case. The torque coupling unit has a friction clutch assembly disposed about one of the output shafts. The friction clutch assembly has a first portion drivingly engaged with one of the output shafts and a second portion drivingly engaged with the differential case. A ball and ramp assembly is disposed adjacent the friction clutch assembly for selectively frictionally loading the friction clutch assembly.

13 Claims, 1 Drawing Sheet

(56) References Cited

U.S. PATENT DOCUMENTS

| | | |
|---|---|---|
| 7,357,748 B2 | 4/2008 | Kelley, Jr. |
| 7,390,278 B2 | 6/2008 | Krisher |
| 7,846,056 B2 | 12/2010 | Chludek et al. |
| 8,388,486 B2 | 3/2013 | Ekonen et al. |
| 2002/0077212 A1 | 6/2002 | Krisher |
| 2003/0171182 A1* | 9/2003 | Peura .................. F16H 48/08 475/150 |
| 2006/0014601 A1 | 1/2006 | Kelley, Jr. |
| 2011/0039652 A1* | 2/2011 | Ekonen ............... B60K 17/344 475/220 |

* cited by examiner

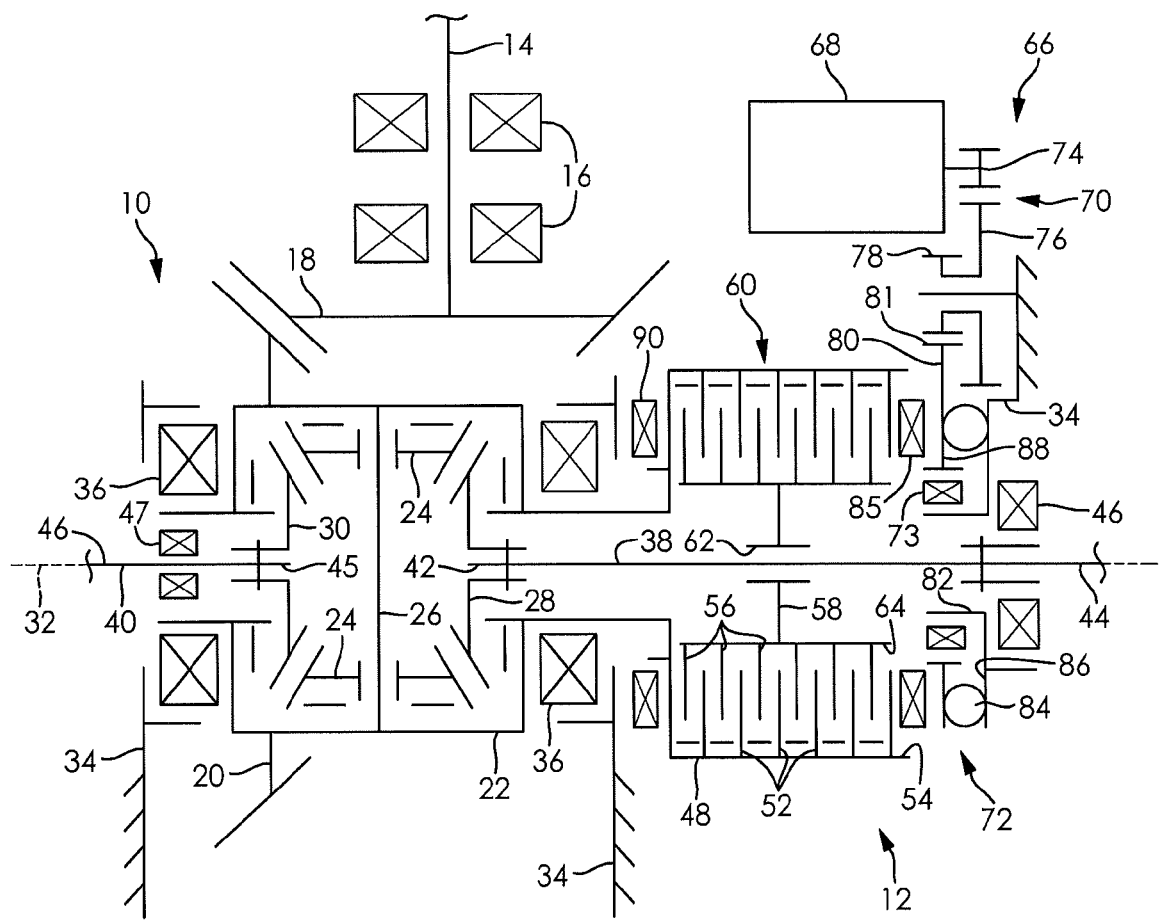

ACTIVE LIMITED SLIP DIFFERENTIAL

RELATED APPLICATIONS

This application claims priority to and the benefit of U.S. Provisional Patent Application Ser. No. 61/931,001 filed on Jan. 24, 2014 which is incorporated by reference herein.

BACKGROUND OF THE INVENTION

Limited slip differentials facilitate a reduction of or an elimination of a differential function present in a vehicle driveline. By engaging a clutch or otherwise drivingly engaging a side shaft of the vehicle with a remaining side shaft or a housing of the differential, the differential function can be reduced or eliminated. Such functionality may be used to increase traction in reduced friction environments or to facilitate a variety of operations which may be performed to increase control of the vehicle.

Typically, through engagement of a plate style clutch forming a portion of the limited slip differential, the differential function is reduced or eliminated. A customized differential case is required to accommodate the clutch. Such a customized differential case may greatly increase a cost of the vehicle incorporating the limited slip differential. Further, orientation of the differential, a plurality of bearings which support the differential, the clutch, and the side shafts may pose additional design considerations which increase a cost and a complexity of the limited slip differential.

The present invention relates to limited slip differentials for a vehicle, and more particularly to a design for a limited slip differential that increases manufacturability and decreases a cost of the limited slip differential compared to conventional designs.

SUMMARY

A limited slip differential assembly for a vehicle has a differential assembly drivingly engaged with a prime mover of the vehicle. A differential mechanism is disposed in a differential case and has two opposite output shafts outwardly extending from the differential case. The output shafts are drivingly engaged with wheels of the motor vehicle.

The assembly also has a torque coupling unit for selectively restricting rotation between one of the output shafts and the differential case. The torque coupling unit has a friction clutch assembly disposed about one of the output shafts. The friction clutch assembly comprises a first portion drivingly engaged with one of the output shafts and a second portion drivingly engaged with the differential case.

The torque coupling unit also has a ball and ramp assembly disposed adjacent the friction clutch assembly for selectively frictionally loading the friction clutch assembly. The ball and ramp assembly comprises at least a first portion and a second portion. The second portion is rotatable with respect to the first portion.

The torque coupling unit also has an actuator in driving engagement with one of the first portion and the second portion of the ball and ramp assembly to selectively cause a rotation therebetween.

The assembly also has a differential housing rotatably supporting the differential assembly and the friction clutch assembly therewithin. The differential housing includes a radially inwardly extending portion about one of the output shafts for receiving a ball and ramp assembly support bearing and an output shaft support bearing.

DESCRIPTION OF THE DRAWINGS

FIG. 1 is a schematic view of one embodiment of an active limited slip differential.

DETAILED DESCRIPTION OF THE PREFERRED EMBODIMENT

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

As shown in the FIGURE, a differential 10 with a torque coupling unit 12 is provided. A pinion shaft 14 is provided and is connected to a source for rotational power. The pinion shaft 14 is mounted on bearings 16 for rotation by the power source. The power source may be an internal combustion engine (not shown), or the like.

The pinion shaft 14 has a pinion gear 18 located thereon that rotates with the shaft 14. The pinion gear 18 is meshed with a ring gear 20. The pinion gear 18 has a first set of teeth (not shown) and the ring gear 20 has a second set of teeth (not shown). The two sets of teeth are complimentary to one another and are meshed with one another to provide rotational drive from one set to the other set.

The ring gear 20 is connected to a differential case 22. More particularly, the ring gear 20 may be integrally formed with the differential case 22, welded to the differential case 22, or it may be secured to the differential case 22 with a plurality of fasteners. It can be appreciated that the connection of the ring gear 20 between the differential case 22 and pinion gear 18 results in rotation of the differential case 22.

The differential case 22 houses a set of differential pinion gears 24 rotatably supported on a spider shaft 26 secured to the differential case 22. More particularly, the differential pinion gears 24 are located opposite one another on the spider shaft 26. The FIGURE illustrates the use of two differential pinion gears 24; however, it is understood that the differential 10 may be configured for use with a greater number of differential pinion gears 24. The differential pinion gears 24 engage a pair of opposite side gears. The side gears comprise first and second side gears 28, 30 adapted to rotate about an axis 32.

The differential case 22 is mounted for rotation within a differential housing 34 (partially shown). The differential case 22 is mounted on bearings 36 to support its rotation within the differential housing 34.

A first and a second side gear shaft 38, 40 are depicted in the FIGURE extending from the first and second side gears 28, 30, respectively. The first side gear shaft 38 has a first end portion 42 and a second end portion 44. The second side gear shaft 40 has a first end portion 45 and a second end portion 46.

The first end portion 42 of the first side gear shaft 38 has a set of splines (not shown) on an exterior surface (not shown) that fit within a central aperture (not shown) of the first side gear 28. The central aperture is defined by complimentary, internal splines (not shown). The first side gear shaft 38 thus turns with the first side gear 28. The first side gear shaft 38 is mounted for rotation within the differential housing 34 on bearings 46. Bearings 46 may be plain or roller bearings.

The second end portion 44 of the first side gear shaft 38 is drivingly engaged with a wheel assembly (not shown) in any conventional manner, such as through a constant velocity joint (not shown) or a wheel flange.

The first end portion 45 of the second side gear shaft 40 has a set of splines (not shown) on an exterior surface (not shown) that fit within a central aperture (not shown) of the second side gear 30. The central aperture is defined by complimentary, internal splines (not shown). The second side gear shaft 40 thus turns with the second side gear 30. The second side gear shaft 40 is mounted for rotation within the differential housing 34 on bearings 47. Bearings 47 may be plain or roller bearings.

The second end portion 46 of the second side gear shaft 40 is drivingly engaged with a wheel assembly (not shown) in any conventional manner, such as through a constant velocity joint (not shown) or a wheel flange.

The differential case 22 is connected to a clutch can 48. The clutch can 48 and the differential case 22 may be integrally formed and unitary with one another or they may be separately formed. If separately formed, the differential case 22 may be connected to the clutch can 48 by mechanical fasteners, splines, or the like. As shown in the FIGURE, bearings 36 support rotation of the differential case 22 within the housing 34.

In the depicted embodiment, the clutch can 48 is a cylindrically shaped object. The clutch can 48 carries a first plurality of clutch plates 52; the clutch plates 52 are radially inwardly extending and are secured to an inner surface 54 of the clutch can 48. The clutch plates 52 are fixed for rotation with the clutch can 48 through a plurality of splines (not shown), but are permitted to move axially along the inner surface 54.

The clutch plates 52 are interleaved with a second plurality of clutch plates 56 located on an inner clutch hub 58 to form a clutch pack 60. The inner clutch hub 58 is a cylindrical shaped member having a radially inwardly extending portion. The inner clutch hub 58 is at least partially located within the clutch can 48. More particularly, the clutch can 48 is at least partially concentric with the inner clutch hub 58. The inner clutch hub 58 has a splined inner surface 62 and a splined outer surface 64. The inner clutch hub 58 is drivingly engaged with the first side gear shaft 38 through the splined inner surface 62 and a plurality of corresponding splines formed on the first side gear shaft 38.

The second plurality of clutch plates 56 are fixed for rotation with the inner clutch hub 58 through a plurality of splines (not shown), but they are permitted to move axially along the splined outer surface 64 of the inner clutch hub 58.

A clutch actuator assembly 66 is located adjacent the clutch pack 60. The clutch actuator assembly 66 comprises an actuator 68, a gear set 70, and a ball and ramp assembly 72. A bearing 73 supports rotation of the ball and ramp assembly 72 within the housing 34 when the ball and ramp assembly 72 is placed in an engaged position.

The actuator 68 may be such as a reversible electric motor as it is compact and easily controllable. It will be appreciated that any other appropriate type of actuator may be used, such as hydraulic or pneumatic, and these are within the scope of the invention.

The actuator 68 drives the gear set 70, which is a reduction set of gears. As shown in the FIGURE, a first gear 74 of the actuator 68 drives a second gear 76. The second gear 76 drives a third gear 78. The gears 74, 76, 78 achieve the desired and torque speed reduction between the motor and the third gear 78. Other gear numbers and orientations are possible other than as shown to result in different speeds and torques.

The third gear 78 is in driving engagement with an actuating ring 80. More preferably, the actuating ring 80 has a set of teeth 81 on an outer radial surface that engages with the teeth on the third gear 78. The teeth 81 of the actuating ring 80 are circumferentially extending from a peripheral edge of the actuating ring 80. The teeth 81 of the actuating ring 80 may cover the full circumference of the actuating ring 80 or a portion of the circumference. The rotation of the third gear 78 drives the teeth 81 of the actuating ring 80, thus rotating the actuating ring 80.

The actuating ring 80 is part of the ball and ramp assembly 72. The ball and ramp assembly 72 also comprises a pressure plate 82 and a plurality of balls 84 between the pressure plate 82 and the actuating ring 80.

The pressure plate 82 resists an axial force applied thereto, causing the actuating ring 80 to apply a force to a first thrust bearing 85 located adjacent thereto. The force applied to the first thrust bearing 85 is used to load the clutch pack 60. The pressure plate 82 is non-rotatably mounted within the housing 34.

An annular radial surface 86 of the pressure plate 82 facing the actuating ring 80 is formed with a set of circumferentially extending grooves (not shown) of varying axial depth. The grooves in the pressure plate 82 face complementary grooves (not shown) on an opposite annular surface 88 of the actuating ring 80, whose depth varies in the opposite circumferential sense.

A corresponding number of the balls 84 are disposed between the pressure plate 82 and the actuating ring 80, one in each pair of the facing grooves. It is understood that the balls 84 may also be rollers which function in a similar manner.

Alternatively, a cam disc actuator (not shown) including cooperative cam surfaces provided on opposite sides of an actuating ring and a pressure collar may be used. It is also appreciated that other types of actuators may be used.

It will be further appreciated that when the actuator 68 moves the actuating ring 80 angularly relative to the pressure plate 82, the actuating ring 80 moves axially and causes the actuating ring 80 to frictionally load the clutch pack 60. The axial movement of the actuating ring 80 is transmitted to the clutch pack 60 through the first thrust bearing 85. The first thrust bearing 85 is provided between the actuating ring 80 and the clutch pack 60 to allow for relative rotation and to reduce the friction between the actuating ring 80 and the clutch pack 60. A second thrust bearing 90 is disposed between the clutch can 48 and the differential housing 34 to allow for relative rotation and to reduce the friction between the clutch can 48 and the differential housing 34.

Wave springs (not shown) may be positioned between the first plurality of clutch plates 52 and the second plurality of clutch plates 56 to ensure the clutch plates 52, 56 are equally spaced in order to minimize the viscous drag torque between the clutch plates 52, 56. The wave springs also produce a preload to ensure seating of the bearing 73, the thrust bearings 85, 90, and the ball and ramp assembly 72.

The compression of the clutch plates 52, 56 causes the clutch plates 52, 56 to rotate together. The connection of the clutch can 48 to the inner clutch hub 58 causes the differential case 22 to be in driving engagement with the first side gear shaft 38. Further, when the differential case 22 is in driving engagement with the first side gear shaft 38, the differential case 22 is also in driving engagement with the second side gear shaft 40 through the differential pinion gears 24. Depending on an engagement level of the ball and ramp assembly 72, a differential function of the differential 10 is reduced or eliminated.

The actuator 68, and thus the torque coupling unit 12, is controlled by an electronic control unit (not shown). The control is carried out by judging vehicle running conditions according to at least one vehicle parameter, including but not limited to, wheel speeds. The differential 10 is thus provided with a limited slip function, which allows torque to be directed to the wheel assembly having a greater amount of traction. When the actuator 68 is not actuated, the differential 10 operates in an open mode without limited slip. Further, the torque coupling unit 12 may be engaged to reduce a slipping of at least one of the wheel assemblies during a vehicle start operation. The torque coupling unit 12 may also be engaged during a vehicle acceleration operation to damp the vehicle against undesirable yaw disturbances. Still yet, the torque coupling unit 12 may also be engaged during a vehicle corning operation to transfer torque to a wheel assembly having an inner position to correct for an undesirable over steer condition.

The differential 10 with the torque coupling unit 12 has several advantages over limited slip differentials known in the art. The differential case 22 may be a standard style open differential case when the differential case 22 is formed separate from the clutch can 48. When the differential case 22 is formed separate from the clutch can 48, the only modification required of the differential case 22 is to enable driving engagement with the clutch can 48, such as through mechanical fasteners, splines, or the like. Accordingly, a position and type of each of the bearings 36 also remains the same as with the standard style open differential case, reducing a cost of the differential 10 with the torque coupling unit 12.

In accordance with the provisions of the patent statutes, the present invention has been described in what is considered to represent its preferred embodiments, however, it should be noted that the invention can be practiced otherwise than as specifically illustrated and described without departing from its scope or spirit.

The invention claimed is:

1. A limited slip differential assembly for a vehicle, comprising:
    a differential assembly having a differential mechanism disposed in a differential case and two opposite output shafts outwardly extending from the differential case;
    a torque coupling unit for selectively restricting rotation between one of the output shafts and the differential case, the torque coupling unit comprising:
    a friction clutch assembly disposed about one of the output shafts, the friction clutch assembly comprising a first portion drivingly engaged with one of the output shafts and a second portion drivingly engaged with the differential case,
    a ball and ramp assembly disposed adjacent the friction clutch assembly for selectively frictionally loading the friction clutch assembly, the ball and ramp assembly comprising at least a first portion and a second portion, the second portion rotatable with respect to the first portion, and
    an actuator in driving engagement with one of the first portion and the second portion of the ball and ramp assembly to selectively cause a rotation therebetween; and
    a differential housing rotatably supporting the differential assembly and the friction clutch assembly therewithin, the differential housing including a radially inwardly extending portion about one of the output shafts for receiving a ball and ramp assembly support bearing and an output shaft support bearing, wherein the ball and ramp assembly support bearing supports rotation of an actuating ring within the differential housing.

2. The limited slip differential assembly of claim 1, wherein said friction clutch assembly first portion is engaged with one of said output shafts by an inner clutch hub.

3. The limited slip differential assembly of claim 2, wherein said inner clutch hub has a splined inner surface for engaging complementary splines on said one of said output shafts.

4. The limited slip differential assembly of claim 3, wherein said inner clutch hub has a splined outer surface for supporting a first plurality of clutch plates of said friction clutch assembly.

5. The limited slip differential assembly of claim 1, wherein said friction clutch assembly second portion is a clutch can connected to said differential case.

6. The limited slip differential assembly of claim 5, wherein said clutch can is concentric to one of said output shafts.

7. The limited slip differential assembly of claim 1, wherein said differential case is connected to a differential spider holding at least one differential pinion thereon.

8. The limited slip differential assembly of claim 6, wherein said inner clutch hub is located radially within said clutch can.

9. The limited slip differential assembly of claim 6, wherein said clutch can has an inner surface with a second plurality of clutch plates.

10. The limited slip differential assembly of claim 1, wherein a first thrust bearing is located between said friction clutch assembly and said actuating ring, said friction clutch assembly located between said first thrust bearing and said differential mechanism.

11. The limited slip differential assembly of claim 10, wherein said actuating ring is part of said ball ramp assembly.

12. The limited slip differential assembly of claim 1, wherein said second portion of said friction clutch assembly is one-pieced with said differential case.

13. The limited slip differential assembly of claim 5, further comprising: a second thrust bearing, wherein said second thrust bearing is located between said differential housing and said clutch can.

* * * * *